United States Patent
Mizuno et al.

(10) Patent No.: US 9,704,616 B2
(45) Date of Patent: Jul. 11, 2017

(54) FLUORINATED ELASTOMER COMPOSITION AND METHOD FOR ITS PRODUCTION, MOLDED PRODUCT, CROSS-LINKED PRODUCT, AND COVERED ELECTRIC WIRE

(71) Applicant: ASAHI GLASS COMPANY, LIMITED, Chiyoda-ku (JP)

(72) Inventors: Go Mizuno, Chiyoda-ku (JP); Masahide Yodogawa, Chiyoda-ku (JP); Yuichi Iwano, Chiyoda-ku (JP); Masao Umino, Chiyoda-ku (JP); Yasuhiko Matsuoka, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 440 days.

(21) Appl. No.: 14/482,057

(22) Filed: Sep. 10, 2014

(65) Prior Publication Data
US 2014/0377558 A1 Dec. 25, 2014

Related U.S. Application Data

(63) Continuation of application No. PCT/JP2013/058633, filed on Mar. 25, 2013.

(30) Foreign Application Priority Data

Mar. 26, 2012 (JP) ................. 2012-069078

(51) Int. Cl.
| | |
|---|---|
| *H01B 3/44* | (2006.01) |
| *C08L 23/08* | (2006.01) |
| *C08L 23/14* | (2006.01) |
| *C08L 27/18* | (2006.01) |
| *C09D 127/18* | (2006.01) |
| *H01B 3/28* | (2006.01) |
| *C08J 3/00* | (2006.01) |

(52) U.S. Cl.
CPC .............. *H01B 3/445* (2013.01); *C08J 3/005* (2013.01); *C08L 23/08* (2013.01); *C08L 23/0846* (2013.01); *C08L 23/14* (2013.01); *C08L 27/18* (2013.01); *C09D 127/18* (2013.01); *H01B 3/28* (2013.01); *H01B 3/441* (2013.01); *H01B 3/447* (2013.01); *C08J 2327/18* (2013.01); *C08J 2423/08* (2013.01); *C08L 2203/202* (2013.01); *C08L 2205/025* (2013.01); *C08L 2205/03* (2013.01); *Y10T 428/2967* (2015.01)

(58) Field of Classification Search
CPC ...... C08L 23/08; C08L 27/18; C08L 23/0846; C08L 23/0884; C08L 2205/03; C08L 2205/025; C08L 2203/202; H01B 3/445; H01B 3/441; H01B 3/447; H01B 3/28; C08J 3/005; C08J 2423/08; C08J 2327/18; C09D 127/18; Y10T 428/2967
See application file for complete search history.

(56) References Cited

U.S. PATENT DOCUMENTS

| | | | |
|---|---|---|---|
| 2016/0194491 A1* | 7/2016 | Taguchi et al. ......... | C08L 63/00 428/379 |
| 2016/0196895 A1* | 7/2016 | Iruya et al. .............. | H01B 3/28 428/379 |

FOREIGN PATENT DOCUMENTS

| | | |
|---|---|---|
| JP | 5-78539 | 3/1993 |
| JP | 6-228397 | 8/1994 |
| JP | 7-97458 | 4/1995 |
| JP | 9-31285 | 2/1997 |
| JP | 10-334738 | 12/1998 |
| JP | 2000-30535 | 1/2000 |
| JP | 2010-186585 | 8/2010 |

OTHER PUBLICATIONS

International Search Report issued in corresponding PCT/JP2013/058633, mailed May 28, 2013.

* cited by examiner

*Primary Examiner* — Nathan M Nutter
(74) *Attorney, Agent, or Firm* — Oblon, McClelland, Maier & Neustadt, L.L.P.

(57) ABSTRACT

To provide a fluorinated elastomer composition which is excellent in flexibility and oil resistance to lubricant oil such as automatic transmission oil, is less susceptible to heat discoloration and is excellent also in moldability, and a molded product, cross-linked product and covered electric wire, using such a fluorinated elastomer composition. A fluorinated elastomer composition comprising a tetrafluoroethylene/propylene copolymer (a), an ethylene/tetrafluoroethylene copolymer (b) and an ethylene copolymer (c) containing epoxy groups, wherein the mass ratio [(a)/(b)] of the tetrafluoroethylene/propylene copolymer (a) to the ethylene/tetrafluoroethylene copolymer (b) is from 70/30 to 40/60, and the mass ratio [(b)/(c)] of the ethylene/tetrafluoroethylene copolymer (b) to the ethylene copolymer (c) containing epoxy groups is from 100/0.1 to 100/10.

10 Claims, 2 Drawing Sheets

FLUORINATED ELASTOMER COMPOSITION AND METHOD FOR ITS PRODUCTION, MOLDED PRODUCT, CROSS-LINKED PRODUCT, AND COVERED ELECTRIC WIRE

TECHNICAL FIELD

The present invention relates to a fluorinated elastomer composition and a method for its production, a molded product, a cross-linked product, and a covered electric wire.

BACKGROUND ART

A tetrafluoroethylene/propylene copolymer (hereinafter sometimes referred to as a "TFE/P copolymer") is used for hoses, tubes, gaskets, packing, diaphragms, sheets, electric wire covering materials, etc., as an elastomer material which is excellent in properties such as heat resistance, oil resistance, chemical resistance, electrical insulation properties, flexibility, etc. and which is radiation cross-linkable.

Further, in order to supplement the properties of a TFE/P copolymer, it has been proposed to blend an ethylene/tetrafluoroethylene copolymer (hereinafter sometimes referred to as "ETFE") to the TFE/P copolymer.

For example, in Patent Document 1, it is attempted to improve mechanical properties such as tensile strength and tear strength, or properties such as toughness, etc. by blending ETFE to a TFE/P copolymer. And, in Patent Document 1, for the purpose of lowering the compound price, a large amount of an ethylene/acrylate copolymer or an ethylene/vinyl acetate copolymer is further blended in addition to the TFE/P copolymer and ETFE.

Further, in Patent Document 2, in order to improve the cut-through properties (properties less susceptible to thermal softening at high temperatures) of a TFE/P copolymer, ETFE is blended together with calcium carbonate.

Also in Patent Document 3, in order to improve the cut-through properties, ETFE is blended.

Patent Document 3 discloses that if the ETFE to be blended to a TFE/P copolymer is too much, the flexibility and elongation tend to decrease, and therefore, the blend ratio of ETFE to the entire blend polymer should be at most 40 mass %.

PRIOR ART DOCUMENTS

Patent Documents

Patent Document 1: JP-A-5-78539
Patent Document 2: JP-A-10-334738
Patent Document 3: JP-A-2010-186585

DISCLOSURE OF INVENTION

Technical Problem

Particularly for an elastomer material to be used for a harness of an engine room of an automobile, excellent flexibility is required in order to secure a degree of freedom for wiring of the harness. In order to secure flexibility while preventing lowering of flexibility and elongation, as pointed out in Patent Document 3, it was necessary to lower the proportion of ETFE to be blended to a TFE/P copolymer. However, if the proportion of ETFE to be blended to a TFE/P copolymer was lowered, there was a case where oil resistance to lubricant oil such as automatic transmission oil was inadequate.

Further, if ETFE was blended to a TFE/P copolymer, heat discoloration sometimes occurred under heating, whereby the degree of freedom in coloration of an electric wire was less. Further, moldability was inadequate, and when used as a covering material for electric wires, defects attributable to molding failure, such as weld-lines, were likely to be formed.

The present invention has been made under these circumstances and has an object to provide a fluorinated elastomer composition which is excellent in flexibility and oil resistance to lubricant oil such as automatic transmission oil, is less susceptible to heat discoloration and is excellent also in moldability, and a method for its production. Further, it also has an object to provide a molded product, cross-linked product and covered electric wire, using such a fluorinated elastomer composition.

Solution to Problem

The present inventors have inspected a fluorinated elastomer composition consisting solely of a TFE/P copolymer and ETFE and have paid attention to the fact that the compatibility of the TFE/P copolymer and ETFE is inadequate. And, they have further proceeded with the study and have found that the compatibility is improved by blending an ethylene copolymer containing epoxy groups in a specific proportion, and it is thereby possible to solve the above problem. The present invention has been accomplished on the basis of such a discovery.

That is, the present invention provides a fluorinated elastomer composition, a method for its production, a molded product, a cross-linked product and a covered electric wire having the following constructions [1] to [10].

[1] A fluorinated elastomer composition comprising the following TFE/P copolymer (a), the following ETFE (b) and an ethylene copolymer (c) containing epoxy groups, wherein the mass ratio [(a)/(b)] of the TFE/P copolymer (a) to the ETFE (b) is from 70/30 to 40/60, and the mass ratio [(b)/(c)] of the ETFE (b) to the ethylene copolymer (c) containing epoxy groups is from 100/0.1 to 100/10, TFE/P copolymer (a): a copolymer comprising from 45 to 70 mol % of units derived from tetrafluoroethylene, from 30 to 55 mol % of units derived from propylene, and from 0 to 20 mol % of units derived from other monomer, and ETFE (b): a copolymer comprising from 45 to 70 mol % of units derived from tetrafluoroethylene, from 30 to 55 mol % of units derived from ethylene, and from 0 to 20 mol % of units derived from other monomer.

[2] The fluorinated elastomer composition according to the above [1], which has a melt flow rate of from 4 to 50 g/10 min. as measured at a temperature of 297° C.

[3] The fluorinated elastomer composition according to the above [1] or [2], wherein the ethylene/tetrafluoroethylene copolymer (b) is a copolymer comprising units derived from tetrafluoroethylene, units derived from ethylene, and units derived from $CF_3CF_2CF_2CF_2CF=CH_2$ or $CF_3CF_2CF_2CF_2CF_2CF_2CH=CH_2$.

[4] The fluorinated elastomer composition according to any one of the above [1] to [3], wherein the ethylene copolymer (c) containing epoxy groups is a copolymer comprising units derived from ethylene, units derived from glycidyl methacrylate and units derived from an ethylene unsaturated ester.

[5] A method for producing a fluorinated elastomer composition as defined in any one of the above [1] to [4], which comprises a step of kneading the TFE/P copolymer (a), the ETFE (b) and the ethylene copolymer (c) containing epoxy groups under a heating condition of from 250 to 320° C.

[6] The method for producing a fluorinated elastomer composition according to the above [5], wherein the step of kneading is a step of kneading for from 1 to 30 minutes by means of an extruder.

[7] A molded product obtained by molding the fluorinated elastomer composition as defined in any one of the above [1] to [4].

[8] A cross-linked product obtained by cross-linking the fluorinated elastomer composition as defined in any one of the above [1] to [4].

[9] A covered electric wire comprising a conductor and a covering material for covering the conductor, wherein the covering material is the fluorinated elastomer composition as defined in any one of the above [1] to [4].

[10] A covered electric wire comprising a conductor and a covering material for covering the conductor, wherein the covering material is the cross-linked product as defined in the above [8].

ADVANTAGEOUS EFFECTS OF INVENTION

The fluorinated elastomer composition of the present invention is excellent in flexibility and oil resistance to lubricant oil such as automatic transmission oil, is less susceptible to heat discoloration and is excellent also in moldability.

Further, the molded product, cross-linked product or covered electric wire of the present invention is excellent in flexibility and oil resistance to lubricant oil such as automatic transmission oil, is less susceptible to heat discoloration, and has little defects attributable to molding failure, such as weld-lines.

DESCRIPTION OF EMBODIMENTS

Fluorinated Elastomer Composition

Figure 1:
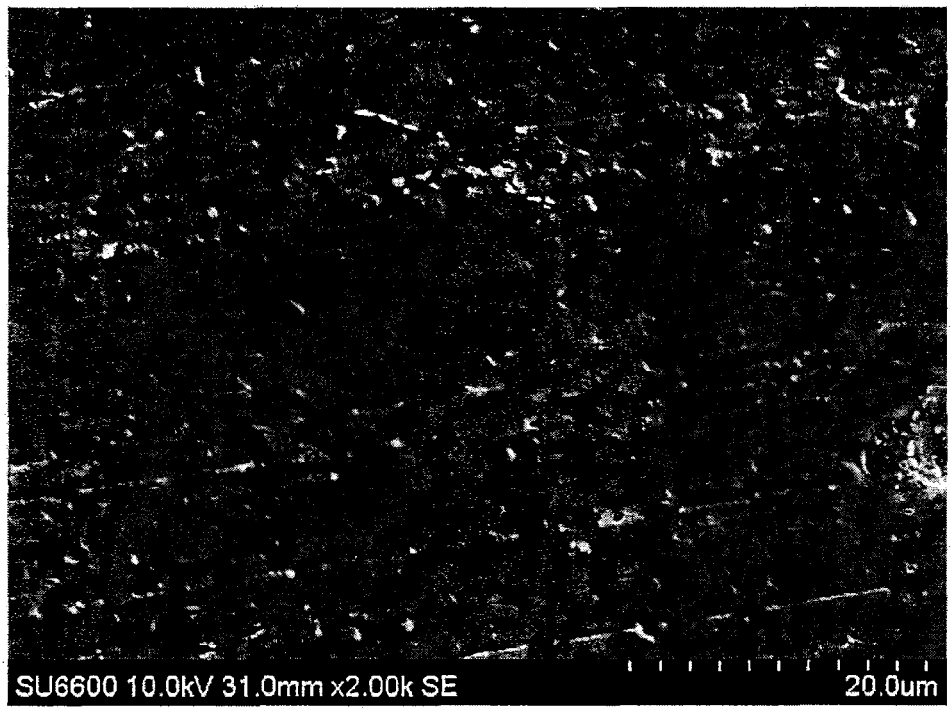
FIG. 1 is a view showing a scanning electron microscopic photograph (2,000 magnifications) of the fluorinated elastomer composition in Example 1 of the present invention.

The fluorinated elastomer composition of the present invention (hereinafter sometimes referred to as "the composition of the present invention") comprises a TFE/P copolymer (a), ETFE (b) and an ethylene copolymer (c) containing epoxy groups.

Here, in the following description, a molar ratio of units constituting each component is a molar ratio measured by means of $^{13}$C-NMR or FT-IR.

(TFE/P copolymer (a))

The TFE/P copolymer (a) (hereinafter sometimes referred to as the "component (a)") is a copolymer comprising from 45 to 70 mol % of units derived from tetrafluoroethylene (hereinafter sometimes referred to as "TFE"), from 30 to 55 mol % of units derived from propylene (hereinafter sometimes referred to as "P") and from 0 to 20 mol % of units derived from other monomer. The component (a) is an elastomeric copolymer (a fluorinated elastomer).

The proportion of units derived from TFE in all units constituting the component (a) is from 45 to 70 mol %, preferably from 50 to 65 mol %, more preferably from 52 to 60 mol %. When the proportion of units derived from TFE is at least 45 mol %, the composition of the present invention is excellent in mechanical properties, chemical resistance and flexibility. Further, when the proportion of units derived from TFE is at most 70 mol %, it may have units derived from P in a sufficient proportion.

The proportion of units derived from P in all units constituting the component (a) is from 30 to 55 mol %, preferably from 35 to 50 mol %, more preferably from 40 to 48 mol %. When the proportion of units derived from P is at least 30 mol %, the composition of the present invention is excellent in molding processability and flexibility. Further, when the proportion of units derived from P is at most 55 mol %, it may have units derived from TFE in a sufficient proportion.

The proportion of units derived from other monomer in all units constituting the component (a) is from 0 to 20 mol %, preferably from 0 to 15 mol %, more preferably from 0 to 10 mol %. When the proportion of units derived from other monomer is at most 20 mol %, the composition of the present invention may have units derived from TFE and P in sufficient proportions.

Other monomer may, for example, be a fluorinated monomer other than TFE, a hydrocarbon monomer other than P, a cross-linked monomer, etc.

The fluorinated monomer may, for example, be vinylidene fluoride, hexafluoropropylene, a perfluoro(alkyl vinyl ether), a perfluoro(alkyloxyalkyl vinyl ether), etc. As the fluorinated monomer, one type may be used alone, or two or more types may be used in combination.

The number of carbon atoms in the perfluoroalkyl group in the perfluoro(alkyl vinyl ether) is preferably from 1 to 6, more preferably from 1 to 4. Further, the number of carbon atoms in the perfluoro(alkyloxyalkyl) group in the perfluoro (alkyloxyalkyl vinyl ether) is preferably from 2 to 8, more preferably from 2 to 6.

As a specific example of the perfluoroalkyl group, a $CF_3$ group, a $C_2F_5$ group or a $C_3F_7$ group is preferred.

The number of etheric oxygen atoms in the perfluoro (alkyloxyalkyl) group is preferably at most 4, more preferably at most 2. As a specific example of the perfluoro (alkyloxyalkyl) group, a $CF_3OCF(CF_3)CF_2$— group, a $C_2F_5OC_2F_4$— group, a $C_3F_7OC_3F_6$— group or a $C_3F_7OC_3F_6OC_3F_6$— group is preferred.

Specific examples of the perfluoro(alkyl vinyl ether) and the perfluoro(alkyloxyalkyl vinyl ether) include $CF_2=CFOCF_3$, $CF_2=CFOCF_2CF_3$, $CF_2=CFOCF_2CF_2CF_3$, $CF_2=CFO(CF_2)_3CF_3$, $CF_2=CFO(CF_2)_4CF_3$, $CF_2=CFOCF_2OCF_3$, $CF_2=CFOCF_2CF_2OCF_3$, $CF_2=CFOCF_2CF_2OCF_2CF_3$, $CF_2=CFO(CF_2)_3OCF_2CF_3$, $CF_2=CFOCF_2CF(CF_3)OCF_3$, $CF_2=CFOCF_2CF(CF_3)O(CF_2)_2CF_3$, $CF_2=CFO(CF_2O)_2CF_2CF_3$, $CF_2=CFO[CF_2CF(CF_3)O]_2CF_3$, $CF_2=CFO[CF_2CF(CF_3)O]_2(CF_2)_2CF_3$, etc.

When the component (a) contains units derived from a fluorinated monomer other than TFE, it is possible to improve e.g. the low temperature flexibility of the composition of the present invention.

The hydrocarbon monomer may, for example, be a vinyl ether such as methyl vinyl ether, ethyl vinyl ether, butyl vinyl ether, tert-butyl vinyl ether, methoxyethyl vinyl ether or ethoxyethyl vinyl ether; a vinyl ester such as vinyl acetate, vinyl benzoate or vinyl nonanoate; or an α-olefin (P is excluded) such as ethylene, butene or isobutene.

When the component (a) contains units derived from a hydrocarbon monomer other than P, it is possible to improve e.g. the molding processability of the composition of the present invention.

In a case where as other monomer, a fluorinated monomer, a hydrocarbon monomer or their mixture is employed, the content of units derived from other monomer in the number of moles of the total of units derived from TFE and P is preferably from 0.01 to 20 mol %, more preferably from 0.1 to 15 mol %, particularly preferably from 0.3 to 10 mol %.

The cross-linkable monomer is meant for a monomer having at least one cross-linkable group in the same molecule. The cross-linkable group in the cross-linkable monomer may, for example, be a carbon-carbon double bond, a halogen atom or the like. The cross-linkable monomer includes, for example, 1-bromo-1,1,2,2-tetrafluoroethyl trifluorovinyl ether, 1-iodo-1,1,2,2-tetrafluoroethyl trifluorovinyl ether, vinyl crotonate, vinyl methacrylate, etc. As the cross-linkable monomer, one type may be used alone, or two or more types may be used in combination.

The content of units derived from a cross-linkable monomer is preferably from 0.001 to 8 mol %, more preferably from 0.001 to 5 mol %, particularly preferably from 0.01 to 3 mol %, in all units constituting the component (a).

By incorporating the units derived from a cross-linkable monomer, it is possible to improve e.g. the mechanical properties or compression set of the composition of the present invention.

The Mooney viscosity ($ML_{1+10}$, 121° C.) of the component (a) is preferably from 20 to 200, more preferably from 30 to 150, most preferably from 40 to 120. The Mooney viscosity is an index for the molecular weight and is measured by the after-described measuring method. The larger the value, the larger the molecular weight, and the smaller the value, the smaller the molecular weight. When the value is within the above range, the fluorinated elastomer composition is excellent in mechanical properties and moldability.

As an example of a commercial product of the component (a), "AFLAS150CS" manufactured by Asahi Glass Company, Limited, may be mentioned.

(ETFE (b))

ETFE (b) (hereinafter sometimes referred to as the "component (b)") is a copolymer comprising from 30 to 80 mol % of units derived from TFE, from 20 to 70 mol % of units derived from ethylene (hereinafter sometimes referred to as "E") and from 0 to 10 mol % of units derived from other monomer.

The component (b) is a resin excellent in heat resistance, oil resistance, electrical insulating properties, chemical resistance, water resistance, radiation resistance, etc.

The proportion of units derived from TFE in all units constituting the component (b) is from 30 to 80 mol %, preferably from 40 to 70 mol %, more preferably from 50 to 65 mol %. When the proportion of units derived from TFE is at least 40 mol %, the composition of the present invention is excellent in oil resistance. Further, when the proportion of units derived from TFE is at most 70 mol %, the component (b) may have units derived from E in a sufficient proportion.

The proportion of units derived from E in all units constituting the component (b) is from 20 to 70 mol %, preferably from 30 to 60 mol %, more preferably from 35 to 50 mol %. When the proportion of units derived from E is at most 60 mol %, the component (b) has a sufficiently high melting point and is excellent in heat resistance. Further, when the proportion of units derived from E is at most 55 mol %, the component (b) may have units derived from TFE in a sufficient proportion.

The proportion of units derived from other monomer in all units constituting the component (b) is from 0 to 10 mol %, preferably from 0.01 to 7 mol %, more preferably from 0.1 to 5 mol %. When the proportion of units derived from other monomer is at most 10 mol %, the component (b) may have units derived from TFE and E in sufficient proportions. Further, when the proportion of units derived from other monomer is at least the lower limit value, it is possible to improve the properties such as stress crack resistance, processability, etc. of the composition of the present invention.

Other monomer may, for example, be a fluorinated olefin other than TFE, a fluoro vinyl ether, a hydrocarbon monomer, a vinyl ether containing no fluorine, etc.

The fluorinated olefin other than TFE may, for example, be a fluorinated ethylene such as vinylidene fluoride or trifluorochloroethylene (provided TFE is excluded); a fluorinated propylene such as $CF_2$=$CFCF_3$, $CF_2$=$CHCF_3$ or $CH_2$=$CHCF_3$; or a monomer represented by the following formula (1) (hereinafter referred to as a "monomer (1)").

Here, in the formula (1), each of $R^1$ and $R^2$ which are independent of each other, is a hydrogen atom or a fluorine atom, and a is an integer of from 1 to 12.

The monomer (1) includes, for example, $CF_3CF_2CH$=$CH_2$, $CF_3CF_2CF_2CF_2CH$=$CH_2$, $CF_3CF_2CF_2CF_2CF_2CF_2CH$=$CH_2$, $CF_3CF_2CF_2CF_2CF$=$CH_2$, $CF_2HCF_2CF_2CF$=$CH_2$, etc.

By incorporating units derived from a fluorinated olefin other than TFE, it is possible to improve the stress crack resistance or mechanical properties of the composition of the present invention.

The fluoro vinyl ether may, for example, be a fluoro vinyl ether of e.g. a monomer represented by the following formula (2) (hereinafter referred to as a "monomer (2)") or a fluoro vinyl ether having a group which can be easily converted to a carboxylic acid group or a sulfonic acid group, such as $CH_3OC$(=$O$)$CF_2CF_2CF_2OCF$=$CF_2$ or $FSO_2CF_2CF_2OCF(CF_3)CF_2OCF$=$CF_2$.

By incorporating units derived from a fluoro vinyl ether, it is possible to improve the stress crack resistance of the composition of the present invention.

Here, in the above formula (2), Rf is a $C_{1-6}$ perfluoroalkyl group, $R^3$ is a fluorine atom or a trifluoromethyl group, and b is an integer of from 0 to 5.

The monomer (2) may, for example, be $CF_3CF_2OCF_2CF_2OCF$=$CF_2$, $C_3F_7OCF(CF_3)CF_2OCF$=$CF_2$, etc.

The hydrocarbon monomer may, for example, be a $C_{3-4}$ α-olefin such as P, butene or isobutene, 4-methyl-1-pentene, cyclohexene, etc.

The vinyl ether containing no fluorine may, for example, be methyl vinyl ether, ethyl vinyl ether, isobutyl vinyl ether, tert-butyl vinyl ether, cyclohexyl vinyl ether, hydroxybutyl vinyl ether, etc. Further, a vinyl ester such as vinyl acetate, vinyl lactate, vinyl butyrate or vinyl pivalate may be mentioned.

By incorporating units derived from a hydrocarbon monomer, it is possible to improve the processability, etc. of the composition of the present invention.

As other monomer, preferred is a monomer (1) since it is thereby possible to improve the mechanical strength of the composition of the present invention, more preferred is a monomer of the formula (1) wherein $R^1$ is a hydrogen atom and $R^2$ is a fluorine atom, particularly preferred is $CF_3CF_2CF_2CF_2CF=CH_2$, $CF_3CF_2CF_2CF_2CH=CH_2$ or $CF_3CF_2CF_2CF_2CF_2CH=CH_2$, and most preferred is $CF_3CF_2CF_2CF_2CH=CH_2$.

The molecular weight of the component (b) is not particularly limited, and a wide range of products i.e. from a low molecular weight product in the form of a wax at 40° C. or less to a melt-moldable high molecular weight product, are useful.

The melt flow rate (hereinafter referred to as "MFR") as an index for the molecular weight is preferably from 0.01 to 50,000 g/10 min., more preferably from 0.1 to 2,000 g/10 min., further preferably from 0.3 to 100 g/10 min. When the MFR is at least the above lower limit value, molding processability, equal to a fluorinated resin, by hot-melting of the composition of the present invention becomes feasible from the viewpoint of equipment. When the MFR is at most the above upper limit value, the molded product will have a strength sufficient for practical use.

Here, MFR in this specification is a mass (g/10 min.) of a resin flowing out in 10 minutes from a nozzle having a diameter of 2.1 mm and a length of 8 mm under a load of 5 kg/cm$^2$ at 297° C., as measured by a Koka-type flow tester.

(Ethylene Copolymer (c) Containing Epoxy Groups)

The ethylene copolymer (c) having epoxy groups (hereinafter sometimes referred to as the "component (c)") is considered to have an effect to improve the compatibility between the component (a) and the component (b).

The component (c) may be an ethylene copolymer such as a bipolymer comprising units derived from E and units derived from a monomer having an epoxy group, or a terpolymer or higher multi-component copolymer comprising units derived from E, units derived from a monomer having an epoxy group and units derived from other monomer. As the component (c), one type may be used alone, or two or more types may be used in combination.

The monomer having an epoxy group may, for example, be an unsaturated glycidyl ether (such as allyl grycidyl ether, 2-methylallyl glycidyl ether or vinyl glycidyl ether), or an unsaturated glycidyl ester (such as glycidyl acrylate or glycidyl methacrylate). Among them, glycidyl methacrylate is preferred, since it is thereby possible to obtain a component (c) which further improves the compatibility between the component (a) and the component (b). As the monomer having an epoxy group, one type may be used alone, or two or more types may be used in combination.

Other monomer may, for example, be an acrylic acid ester (such as methyl acrylate or ethyl acrylate), methacrylic acid ester (such as methyl methacrylate or ethyl methacrylate), a fatty acid vinyl ester such as vinyl acetate, an α-olefin other than E, etc. Among them, an ethylene unsaturated ester, i.e. an acrylic acid ester, a methacrylic acid ester or a fatty acid vinyl ester is preferred. When such a monomer is used as other monomer, it is possible to obtain a component (c) which further improves the compatibility between the component (a) and the component (b). As such other monomer, one type may be used alone, or two or more types may be used in combination.

The component (c) is preferably a copolymer having units derived from E and units derived from glycidyl methacrylate. When such a copolymer is used, a cross-linked product of the obtainable fluorinated elastomer composition will be further excellent in properties such as flexibility, oil resistance, moldability, etc.

As an example of such a copolymer, an ethylene/glycidyl methacrylate copolymer may be mentioned.

Further, a copolymer comprising units derived from E, units derived from glycidyl methacrylate and units derived from an ethylene unsaturated ester, is also preferred from the viewpoint of moldability and mechanical properties. As a specific example, an ethylene/glycidyl methacrylate/vinyl acetate copolymer, an ethylene/methyl acrylate/glycidyl methacrylate copolymer or an ethylene/ethyl acrylate/glycidyl methacrylate copolymer may be mentioned. Among them, an ethylene/methyl acrylate/glycidyl methacrylate copolymer or an ethylene/ethyl acrylate/glycidyl methacrylate copolymer is preferred.

The content of units derived from E in the component (c) is preferably from 55 to 99.9 mol %, more preferably from 70 to 94 mol %. The content of units derived from the monomer containing an epoxy group is preferably from 0.1 to 45 mol %, more preferably from 1 to 10 mol %. When the content of units derived from E is at least 55 mol %, the composition of the present invention will be excellent in heat resistance and toughness. When the content of units derived from the monomer containing an epoxy group is at least 2 mol %, the composition of the present invention will be excellent in moldability and mechanical properties.

In a case where the component (c) has units derived from other monomer, the content of units derived from such other monomer is preferably from 1 to 30 mol %, more preferably from 5 to 20 mol %. When the component (c) is used wherein the contents of the respective units are within the above ranges, it is possible to further improve the compatibility between the component (a) and the component (b). As a result, the cross-linked product of the obtainable fluorinated elastomer composition will be further excellent in properties such as flexibility, oil resistance, heat resistance, moldability, etc.

As a commercial product of the component (c), "Bond Fast E (trade name, manufactured by Sumitomo Chemical Co., Ltd.)" may, for example, be mentioned. As a commercial product of an ethylene/methyl acrylate/glycidyl methacrylate copolymer, "Bond Fast 7M (trade name, manufactured by Sumitomo Chemical Co., Ltd.)" may, for example, be mentioned.

(Blend Ratios)

In the fluorinated elastomer composition of the present invention, the mass ratio [(a)/(b)] of the component (a) to the component (b) is from 70/30 to 40/60, preferably from 65/35 to 45/55, more preferably from 60/40 to 50/50.

When the blend ratio of the component (a) is at least the above lower limit value, excellent flexibility is obtainable. On the other hand, when the blend ratio of the component (b) is at least the above lower limit value, excellent oil resistance is obtainable.

In the fluorinated elastomer composition of the present invention, the mass ratio [(b)/(c)] of the component (b) to the component (c) is from 100/0.1 to 100/10, preferably from 100/0.3 to 100/7, more preferably from 100/0.5 to 100/5.

If the blend ratio of the component (c) is less than the above lower limit value, the cross-linked product of the fluorinated elastomer composition is likely to have a problem of heat discoloration. This is considered to be such that the compatibility between the component (a) and the component (b) tends to be thereby low.

If the blend ratio of the component (c) exceeds the above upper limit value, the oil resistance tends to be low, and at the same time, the heat resistance tends to be inadequate.

Further, when the entire fluorinated elastomer composition is taken as 100 mass%, the total content of the components (a) to (c) i.e. [((a)+(b)+(c))/fluorinated elastomer compositon] is preferably at least 30 mass %, more preferably at least 50 mass %.

The fluorinated elastomer composition of the present invention may contain an optional component in addition to the above components (a) to (c). The optional component may, for example, be a cross-linking agent, a cross-linking aid, a filler, a stabilizer, a colorant, an antioxidant, a processing aid, a sliding agent, a lubricant, a flame retardant, an antistatic agent, etc., and at least one of them may be incorporated as the case requires.

In a case where the fluorinated elastomer composition of the present invention is to be cross-linked, among these additives, a cross-linking agent or a cross-linking aid is preferably incorporated.

As the cross-linking agent, any conventional one may be used, but an organic peroxide is preferred. As such an organic peroxide, one which is capable of easily generating radicals under heating or oxidation-reduction, may be used. The fluorinated elastomer composition cross-linked by using an organic peroxide is excellent in heat resistance.

Specific examples of the organic peroxide include 1,1-di (t-hexylperoxy)-3,5,5-trimethylcyclohexane, 2,5-dimethylhexane-2,5-dihydroperoxide, di-t-butyl peroxide, t-butylcumyl peroxide, dicumyl peroxide, α,α'-bis(t-butylperoxy)-p-diisopropylbenzene, 2,5-dimethyl-2,5-di(t-butylperoxy)-hexane, 2,5-dimethyl-2,5-di(t-butylperoxy)-hexine-3, dibenzoyl peroxide, t-butyl peroxybenzene, 2,5-dimethyl-2,5-di(benzoylperoxy)hexane, t-butylperoxymaleic acid, t-hexylperoxyisopropyl monocarbonate, etc. Among them, α,α'-bis(t-butylperoxy)-p-d iisopropylbenzene is preferred. These organic peroxides are excellent in cross-linking performance of the fluorinated elastomer composition.

The content of the organic peroxide is preferably from 0.1 to 5 parts by mass, more preferably from 0.2 to 4 parts by mass, further preferably from 0.5 to 3 parts by mass, per 100 parts by mass of the total content of the components (a) to (c) in the fluorinated elastomer composition. Within such a range, the cross-linking efficiency of the organic peroxide is high.

The cross-linking aid may, for example, be triallyl cyanurate, triallyl isocyanurate, triacryl formal, triallyl trimellitate, dipropargyl terephthalate, diallyl phthalate, tetraallyl terephthalamide, triallyl phosphate, etc. Among them, triallyl isocyanurate is preferred. As the cross-linking aid, at least one type may be used.

In a case where the fluorinated elastomer composition contains a cross-linking aid, the content of the cross-linking aid is preferably from 0.1 to 30 parts by mass, more preferably from 0.5 to 15 parts by mass, further preferably from 1 to 10 parts by mass, per 100 parts by mass of the component (a). When the content of the cross-linking aid is at least the above lower limit value, the cross-linking rate is high, and a sufficient cross-linking degree is readily obtainable. When it is at most the above upper limit value, the properties such as elongation, etc., of a cross-linked product obtained by cross-linking of the fluorinated elastomer composition will be good.

The filler may, for example, be carbon black, white carbon, clay, talc, calcium carbonate, glass fibers, carbon fibers, a fluororesin (such as polytetrafluoroethylene or ETFE), etc.

As the carbon black, one commonly used as a filler for fluororubber may be employed without any particular restriction. Its specific examples include furnace black, acetylene black, thermal black, channel black, graphite, etc., and furnace black is preferred. The furnace black may, for example, be HAF-LS carbon, HAF carbon, HAF-HS carbon, FEF carbon, GPF carbon, APF carbon, SRF-LM carbon, SRF-HM carbon, MT carbon, etc., and among them, MT carbon is more preferred. As the filler, at least one type may be used.

In a case where the fluorinated elastomer composition contains carbon black, the content of carbon black is preferably from 1 to 50 parts by mass, more preferably from 3 to 20 parts by mass, per 100 parts by mass of the component (a). When the content of carbon black is at least the above lower limit value, the cross-linked product of the fluorinated elastomer composition will be excellent in strength, and it is possible to sufficiently obtain a reinforcing effect by blending carbon black. Further, when it is at most the above upper limit value, the elongation of the cross-linked product will also be excellent. Thus, when the content of carbon black is within the above range, the balance of the strength and elongation of the cross-linked product will be good.

In a case where the fluorinated elastomer composition contains a filler other than carbon black, the content of such a filler is preferably from 5 to 200 parts by mass, more preferably from 10 to 100 parts by mass, per 100 parts by mass of the component (a).

Further, as the filler, carbon black and a filler other than carbon black may be used in combination. In a case where the fluorinated elastomer composition contains carbon black and a filler other than carbon black, their content is preferably from 1 to 100 parts by mass, more preferably from 3 to 50 parts by mass, per 100 parts by mass of the component (a).

The stabilizer may, for example, be copper iodide, lead oxide, calcium oxide, magnesium oxide, aluminum oxide, titanium oxide, antimony oxide, phosphorus pentaoxide, etc.

The processing aid may, for example, be a higher fatty acid or an alkali metal salt of a higher fatty acid. Specifically, stearic acid, a stearic acid salt or a lauric acid salt is preferred. The content of the processing aid is preferably from 0.1 to 10 parts by mass, more preferably from 0.2 to 5 parts by mass, further preferably from 1 to 3 parts by mass, per 100 parts by mass of the component (a). As the processing aid, at least one type may be used.

The lubricant may, for example, be a higher fatty acid or an alkali metal salt of a higher fatty acid, and stearic acid, a stearic acid salt or a lauric acid salt is preferred. The content of the lubricant is preferably from 0.1 to 20 parts by mass, more preferably from 0.2 to 10 parts by mass, most preferably from 1 to 5 parts by mass, per 100 parts by mass of the total content of the components (a) to (c) in the fluorinated elastomer composition.

(Properties of Fluorinated Elastomer Composition)

The melt flow rate (MFR) of the fluorinated elastomer composition of the present invention is preferably from 4 to 50 g/10 min., more preferably from 5 to 40 g/10 min., most preferably from 6 to 30 g/10 min. When MFR is within such a range, the moldability and mechanical properties will be excellent.

The flexural modulus of the fluorinated elastomer composition of the present invention is preferably from 10 to 600

MPa, more preferably from 50 to 400 MPa, most preferably from 70 to 300 MPa. The flexural modulus is a value which is an index for flexibility. The larger the flexural modulus, the lower the flexibility, and the smaller the flexural modulus, the higher the flexibility.

(Method for Producing Fluorinated Elastomer Composition)

The fluorinated elastomer composition of the present invention is produced by kneading the above-described components (a) to (c) and optional components such as various additives to be incorporated as the case requires, by means of a known instrument having a kneading mechanism, such as an internal mixer, a single screw kneader, a twin-screw kneader, a single screw extruder, a twin-screw extruder or a multi-screw extruder. Among them, it is preferred to carry out kneading by means of an extruder such as a twin-screw extruder or a multi-screw extruder. Here, the optional components may be added together with the components (a) to (c) in the step of kneading the components (a) to (c), or may be added after kneading the components (a) to (c).

The kneading of the components is preferably melt-kneading which is carried out under heating at a temperature of from 250 to 320° C. The heating temperature is more preferably from 255 to 310° C., further preferably from 260 to 300° C. When the kneading temperature is within such a range, the ratio in melt-viscosity of the component (a) and the component (b) becomes close to 1, a fluorinated elastomer composition excellent in dispersibility is obtainable, and the molded product obtainable therefrom will be excellent in surface smoothness.

By the melt-kneading, the components (a) to (c) are melted and compatibilized to one another to be in a homogeneous dispersed state. Actually, as a result of morphology observation by means of a scanning electron microscope, it has been confirmed that the dispersed phase underwent a particle size reduction. Further, compatibilization of the component (c) and the component (b) has been confirmed by a change in the glass transition point as a result of observation of the peak temperature of Tan δ in the measurement of the dynamic viscoelasticity of the component (b).

Solely by the two components of the components (a) and (b), a problem of heat discoloration is likely to occur. This is considered to be such that the two components are not compatible with each other, and even if only these two components are kneaded under heating, dispersion is likely to be partially inadequate.

In the present invention, the component (c) is added, whereby a fluorinated elastomer composition having excellent properties is obtainable. This is considered to be such that the compatibility is improved by the component (c). Especially when the mass ratio of the component (a) to the component (b) is from 55/45 to 45/55, the two copolymers may sometimes form a continuous phase.

It is considered that in a case where the component (a) and the component (b) form a continuous phase, such a morphology is fixed, whereby the flexibility and heat resistance of the fluorinated elastomer composition can be maintained. It is considered that by such fixing of the morphology, dispersion failure may be prevented, and it is possible to obtain a molded product excellent in mechanical properties such as elongation, etc.

As the apparatus to be used for melt-kneading, a twin-screw extruder, or a single screw extruder equipped with a screw having a high kneading efficiency, is preferred, a twin-screw extruder is more preferred, and a twin-screw extruder equipped with screws having a high kneading efficiency is most preferred. As a screw having a high kneading efficiency, it is more preferred to select one which has an adequate kneading efficiency for the composition and which presents no excessive shearing force.

The shear speed is preferably set depending upon the melt-viscosity of the composition within the above-mentioned temperature range.

The rotational speed of the screw of the extruder in the melt-kneading is preferably from 50 to 1,000 rpm, more preferably from 100 to 500 rpm. If the screw rotational speed is too low, the dispersibility of the composition obtainable by shearing may sometimes be low, and if it is too high, the molecular chains of the copolymers are likely to be cut, whereby elongation of the obtainable composition tends to be low. When the screw rotational speed is within such a range, the compatibilizing reaction properly proceeds, and the balance of the strength and elongation will be good.

The progress of compatibilization may be controlled by adjusting parameters such as the kneading time, kneading temperature, shearing speed, etc. Especially when the shearing speed condition is adjusted so as to minimize the difference in melt-viscosity between the component (b) and the component (c), the dispersed particles of the component (b) will be further reduced in their size.

The melt-kneading is conducted until the viscosity of the composition becomes constant. The change in viscosity during the melt-kneading of the composition may be inspected by a change with time of the rotational torque by a torque meter via the screw. Here, "until the viscosity of the composition becomes constant" means that the melt-kneading is conducted until such a state that the change in the rotational torque value is within 5% from the center value for at least a predetermined time.

The time required for the melt-kneading may vary depending upon the temperature for the melt-kneading, the blend composition of the composition or the shape of the screw, but, from the viewpoint of the economical efficiency and productivity, it is preferably from 1 to 30 minutes, more preferably from 1 to 20 minutes, further preferably from 2 to 10 minutes.

For example, in a case where the component (a) having a melt viscosity of 2.3 kPa·s and the component (b) having a melt viscosity of 2.4 kPa·s are to be melt-kneaded in a mass ratio of 50/50 at 270° C., in the case of an internal mixer, the kneading time is preferably from 2 to 7 minutes. Further, in the case of a twin screw extruder, a retention time of from 1 to 5 minutes is preferred. The retention time may be set by preliminarily measuring the change with time of the viscosity by means of a batch-type twin screw kneader such as Laboplasto Mill (manufactured by Toyo Seiki Co., Ltd.) and based on such data of the change with time.

The form of the component (b) to be used for the melt-kneading is preferably a powder. As such a powder, one with a small particle size is more preferred. When the particle size is small, kneading becomes easy at the time of conducting the melt-kneading, and besides, a uniform melt-kneaded state is readily obtainable. Particularly, as such a powder, a powder obtained by drying an ETFE slurry obtained by solution polymerization is preferred.

Further, the form of the component (a) is preferably crumbs. It is particularly preferred to use crumbs of a TFE/P copolymer obtained by coagulating a latex of TFE/P copolymer obtained by emulsion polymerization, by drying the crumbs.

It is also preferred that before the melt-kneading, the crumbs of the TFE/P copolymer and the powder of ETFE are mixed without heating, by means of a conventional apparatus. Further, it is also preferred to mix the two copolymers in the extruder at the time of melt-kneading.

Molded Product and Cross-Linked Product

The molded product of the present invention is a molded product obtained by molding the fluorinated elastomer composition of the present invention. The molding method may, for example, be injection molding, extrusion molding, coextrusion molding, blow molding, compression molding, inflation molding, transfer molding or calendar molding.

The fluorinated elastomer composition of the present invention has a melt viscosity lower than the component (a) as a raw material, and thus, is excellent in molding processability, as the withdrawing speed may be set to be high.

The cross-linked product of the present invention is one obtained by cross-linking the fluorinated elastomer composition of the present invention. The cross-linking is preferably carried out at the same time as molding, or after molding.

The molded product or the cross-linked product may, for example, be made to be an electrical insulating material such as a covering material for e.g. electrical components. As specific applications, in addition to a coating material in the after-described covered electric wire, a sheath material for protecting an electric wire, an insulating covering material and sheath material for cables, etc. may be mentioned.

Further, the cross-linked product may be made to be a cylindrical product such as a hose, tube, etc. Such a cylindrical product may be produced by extrusion-molding the fluorinated elastomer composition into a cylindrical shape, followed by cross-linking.

The cross-linked product of the present invention may also be made to be various components to be used in various industrial fields such as the automobile field, the industrial robot field, the heating equipment field, such as gaskets, packing, diaphragms, etc.

The cross-linking method for obtaining the cross-linked product is not particularly limited. For example, it may be a chemical cross-linking method using as a cross-linking agent an organic peroxide such as α,α'-bis(t-butylperoxy)-p-diisopropylbenzene or dicumyl peroxide, or an irradiation cross-linking method using an ionizing radiation such as X-rays, γ-rays, electron beams, proton beams, heavy proton beams, α-rays or β-rays.

In an application to a covering material for an electric component such as an electric wire, an electron beam cross-linking using electron beams as the ionizing radiation, is preferred, and in an application to a cylindrical product such as a hose, tube, etc., a chemical cross-linking method using an organic peroxide, is preferred.

Covered Electric Wire

The covered electric wire of the present invention is one having a conductor covered with the fluorinated elastomer composition or the cross-linked product of the present invention.

The conductor is not particularly limited and may, for example, be copper, a copper alloy, aluminum, an aluminum alloy, various plated wires such as tin-plated, silver-plated and nickel-plated wires, a stranded wire, a super conductive conductor, a plated wire for semiconductor element lead, etc.

The covered electric wire having a conductor covered by the cross-linked product of the present invention may be produced by irradiating with electron beams a covered electric wire of the present invention having a conductor covered with the fluorinated elastomer composition of the present invention to cross-link the fluorinated elastomer composition.

The irradiation dose of electron beams is preferably from 50 to 700 kGy, more preferably from 80 to 400 kGy, most preferably from 100 to 250 kGy. The temperature at the time of irradiation with electron beams is preferably from 0 to 300° C., more preferably from 10 to 200° C., most preferably from 20 to 100° C.

The fluorinated elastomer composition of the present invention has a melt viscosity lower than the component (a) as a raw material, and thus is excellent in molding processability, as the withdrawing speed may be set to be high. Accordingly, the covered electric wire of the present invention can be produced at a high speed. Further, it contains the component (a), whereby, as compared with a covered electric wire obtained by using the thermoplastic component (b) only, it can be used continuously at a high temperature, and it is excellent also in flexibility and thus is suitable for application to e.g. a covered electric wire for automobiles, which is required for wiring to conserve space.

EXAMPLES

Now, the present invention will be described specifically with reference to Examples and Comparative Examples. Materials used in each Example are as follows.

Component (a)

"AFLAS 150C" manufactured by Asahi Glass Company, Limited, being a TFE/P bipolymer, was used.

The molar ratio (TFE/P) of units derived from TFE to units derived from P, was 56/44; a peroxide-cross-linked type; the fluorine content was 57 mass %; the Mooney viscosity $ML_{1+10}$ (121° C.) was 120; the glass transition temperature (Tg) was −3° C.; and the melting point (Tm) was nil.

Component (b)

"Fluon LM-730AP" manufactured by Asahi Glass Company, Limited, being an E/TFE/(perfluorobutyl)ethylene terpolymer, was used.

The molar ratio (E/TFE/(perfluorobutyl)ethylene) of units derived from E, units derived from TFE and units derived from (perfluorobutyl)ethylene, was 40/57/3; MFR was 25 g/10 min.; Tg was 75° C.; and Tm was 225° C.

Component (c)

"Bond Fast 7M" manufactured by Sumitomo Chemical Co., Ltd., being an ethylene/methyl acrylate/glycidyl methacrylate copolymer, was used.

The content of units derived from E was 67 mol %; the content of units derived from methyl acrylate was 27 mol %; the content of units derived from glycidyl methacrylate was 6 mol %; MFR was 7 g/10 min.; Tg was −33° C.; and Tm was 52° C.

Component (d)

As a comparison to the component (c), "Everflex EV260" manufactured by Du Pont-Mitsui Polychemical Co., Ltd., being an ethylene/vinyl acetate copolymer, was used. The component (d) has no epoxy group.

The content of units derived from E was 72 mol %; the content of units derived from vinyl acetate was 28 mol %; MFR was 6 g/10 min. (measurement temperature: 190° C.); Tg was −27° C.; and Tm was 72° C.

Filler

Silica, Aerosil R972, manufactured by Toshin Chemicals Co., Ltd.

Cross-Linking Aid

Triallyl isocyanate, manufactured by Nippon Kasei Chemical Co., Ltd.

Examples 1 to 3 and Comparative Examples 1 to 7

By means of an internal mixer, the above-mentioned respective materials were sufficiently kneaded (melt-kneaded) in the blend ratios (mass-based) shown in Table 1 or 2 to obtain a fluorinated elastomer composition in each Example. The kneading temperature and time were 250° C.×10 min., and the rotor rotational speed was 150 rpm.

Then, the obtained fluorinated elastomer composition was press-molded under conditions of 250° C.×15 min. and 10 MPa to prepare a sheet having a thickness of about 1 mm. Then, each sheet was subjected to electron beam cross-linking with an irradiation dose of 120 kGy to obtain a cross-linked sample in each Example.

Observation of Fluorinated Elastomer Composition

The fluorinated elastomer compositions in Examples 1 and 3 and Comparative Examples 2 and 3 were observed by a scanning electron microscope (2,000 magnifications). The results are shown in FIGS. 1 to 4.

Figure 2:
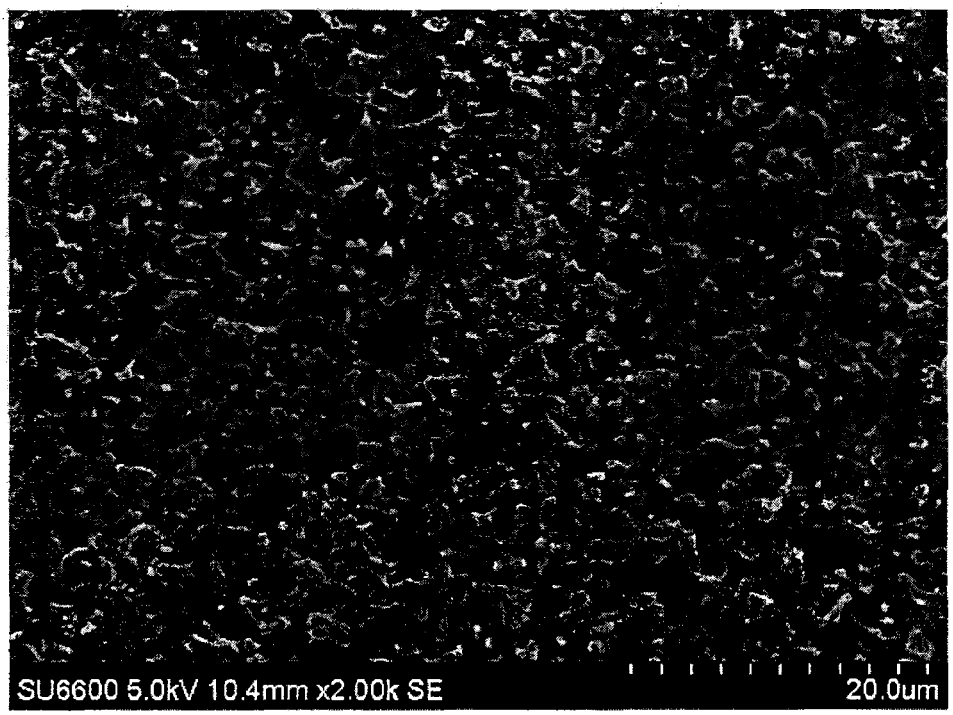
FIG. 2 is a view showing a scanning electron microscopic photograph (2,000 magnifications) of the fluorinated elastomer composition in Example 3 of the present invention.

As shown in FIG. 1, it was observed that in Example 1, the component (a) and the component (b) formed a continuous phase. Further, as shown in FIG. 2, it was observed that in Example 3, the component (b) was well dispersed in the component (a) in the form of fine dispersed phases.

Figure 3:
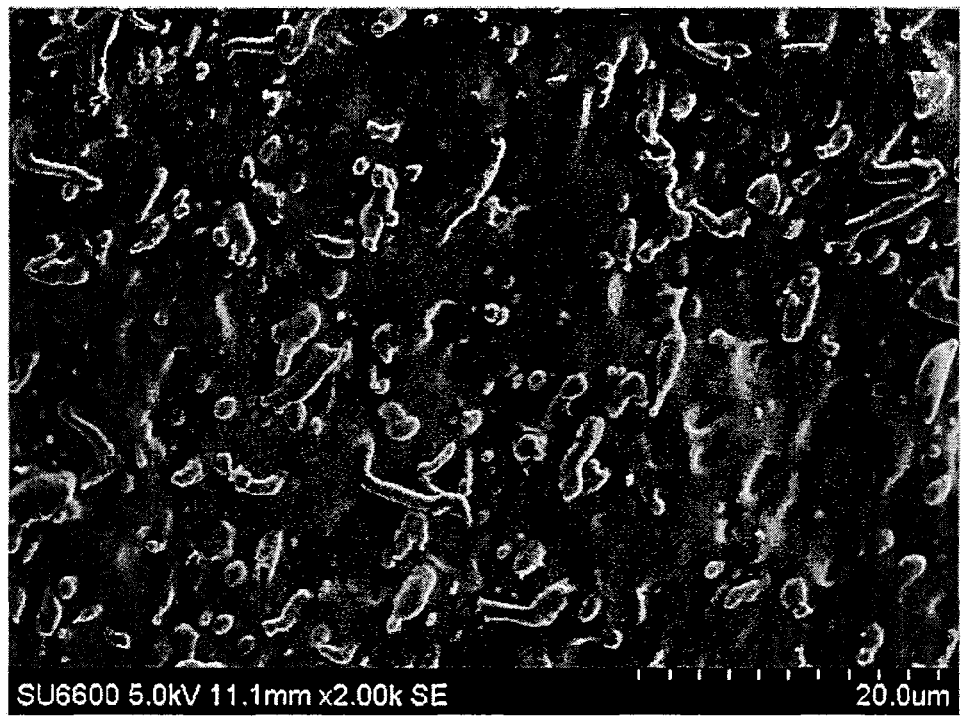
FIG. 3 is a view showing a scanning electron microscopic photograph (2,000 magnifications) of the fluorinated elastomer composition in Comparative Example 2 of the present invention.
Figure 4:
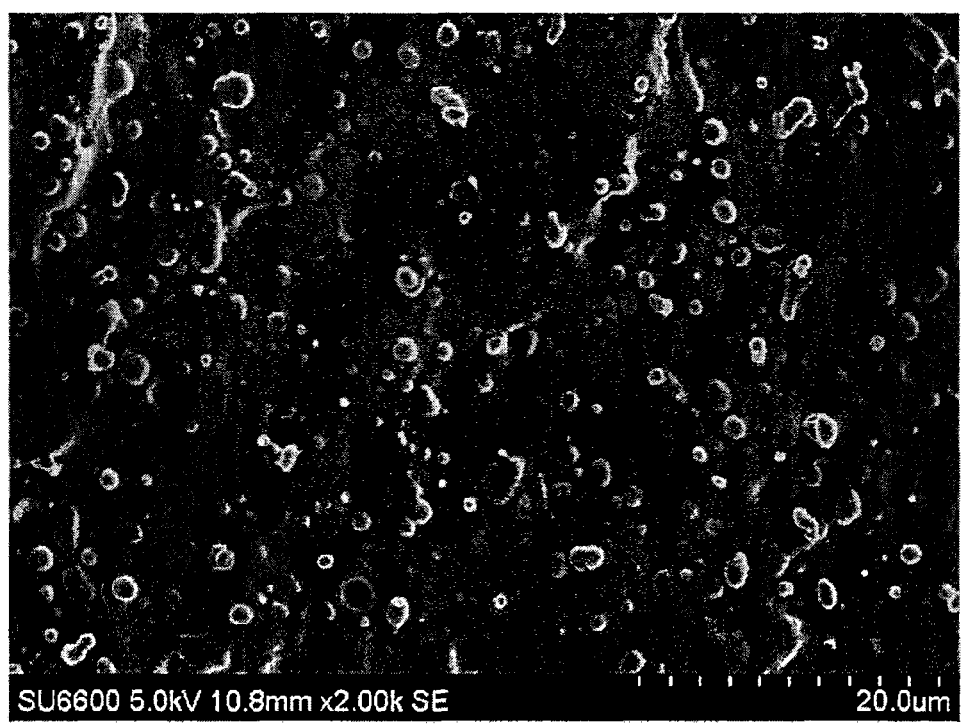
FIG. 4 is a view showing a scanning electron microscopic photograph (2,000 magnifications) of the fluorinated elastomer composition in Comparative Example 3 of the present invention.

Whereas, as shown in FIGS. 3 and 4, it was observed that in Comparative Examples 2 and 4, the component (b) was present in the component (a) in the form of irregular and large dispersed phases, thus showing poor dispersibility.

Evaluation of Fluorinated Elastomer Composition

Yellowness as an index for heat discoloration was obtained in accordance with JIS K7373, 2006. With respect to Examples other than Example 1 and Comparative Example 7, by visual comparison to Example 1 and Comparative Example 7, one where yellowness corresponds to less than 10 was evaluated to be ○ (good), and one where yellowness corresponds to 10 or higher was evaluated to be X (no good). For MFR, the mass (g) of the fluorinated elastomer composition flowing out, in unit time (in 10 min.), from a nozzle having a diameter of 2 mm and a length of 8 mm under a load of 5 kg at a temperature of 297° C., was measured by means of a melt indexer and taken as MFR.

The maximum withdrawing speed was measured by means of a capillary rheometer by changing the withdrawing speed at an extrusion temperature of 300° C. at an extrusion speed of 5 mm/min. with a capillary diameter of 1 mm. The results are shown in Tables 1 and 2.

Evaluation of Cross-Linked Sample

With respect to the cross-linked sample in each Example, normal state physical properties (initial tensile strength and tensile elongation), heat ageing resistance (retention of strength, and retention of elongation) and ATF resistance (volume change when exposed to automatic transmission oil at 165° C. for 120 hours) were evaluated in accordance with JIS K6251, 1999 and JIS K6253, 1999.

Here, the retention of strength for heat ageing resistance is the proportion of the tensile strength after being left at 250° C. for 96 hours, to the initial tensile strength, and the retention of elongation for heat ageing resistance is the proportion of the tensile elongation after being left at 250° C. for 96 hours, to the initial tensile elongation.

Further, the flexural modulus as an index for flexibility was evaluated in accordance with JIS K7171,1994. The results are shown in Tables 1 and 2.

TABLE 1

| | | Examples | | |
|---|---|---|---|---|
| Items | | 1 | 2 | 3 |
| Blend ratios | Component (a) | 50 | 50 | 60 |
| | Component (b) | 50 | 50 | 40 |
| | Component (c) | 1 | 4 | 0.1 |
| | Component (d) | — | — | — |
| | Filler | 20 | 20 | 20 |
| | Cross-linking aid | 5 | 5 | 5 |
| Fluorinated elastomer composition | Yellowness | ○ (2.2) | ○ | ○ |
| | MFR (g/10 min.) | 18.3 | 12.6 | 11.9 |
| | Maximum withdrawing speed (m/min.) | 83.8 | — | — |
| Initial | Tensile strength (MPa) | 14.0 | 13.5 | 11.9 |
| | Tensile elongation (%) | 209 | 220 | 220 |
| Heat ageing resistance | Retention of strength (%) | 92 | 100 | 99 |
| | Retention of elongation (%) | 93 | 93 | 121 |
| ATF resistance | Volume change (%) | 3.1 | 5.7 | 3.3 |
| Flexibility | Flexural modulus (MPa) | 143 | 107 | 77 |

TABLE 2

| | | Comparative Examples | | | | | | |
|---|---|---|---|---|---|---|---|---|
| Items | | 1 | 2 | 3 | 4 | 5 | 6 | 7 |
| Blend ratios | Component (a) | 100 | 70 | 70 | 50 | 50 | 50 | 40 |
| | Component (b) | — | 30 | 30 | 50 | 50 | 50 | 60 |
| | Component (c) | — | — | 5 | — | 10 | — | — |
| | Component (d) | — | — | — | — | — | 10 | — |
| | Filler | 20 | 20 | 20 | 20 | 20 | 20 | 20 |
| | Cross-linking aid | 5 | 5 | 5 | 5 | 5 | 5 | 5 |

TABLE 2-continued

|  |  | Comparative Examples | | | | | | |
|---|---|---|---|---|---|---|---|---|
| Items | | 1 | 2 | 3 | 4 | 5 | 6 | 7 |
| Fluorinated elastomer composition | Yellowness | ○ | X | ○ | X | ○ | ○ | X (10.5) |
| | MFR (g/10 min.) | 1.1 | 10.0 | 8.0 | 14.7 | 15.9 | 7.4 | 16.5 |
| | Maximum withdrawing speed (m/min.) | — | — | — | 79.9 | — | — | 66.2 |
| Initial | Tensile strength (MPa) | 20.7 | 6.8 | 10.7 | 14.5 | 12.5 | 14.1 | 20.2 |
| | Tensile elongation (%) | 157 | 187 | 287 | <100 | 250 | 179 | 411 |
| Heat ageing resistance | Retention of strength (%) | 97 | 137 | 86 | — | 76 | 59 | 62 |
| | Retention of elongation (%) | 125 | 111 | 115 | — | 135 | 196 | 58 |
| ATF resistance | Volume change (%) | 6.2 | 3.9 | 9.2 | 2.7 | 12.7 | 12.9 | 1.6 |
| Flexibility | Flexural modulus (MPa) | 15 | 99 | 53 | 150 | 112 | 94 | 163 |

As shown in Tables 1 and 2, each of the fluorinated elastomer compositions in Examples 1 to 3 was less susceptible to heat discoloration with yellowness being less than 10. Whereas in Comparative Examples 2, 4 and 7 containing no component (c) and no component (d), yellowness was at least 10, and they were ones susceptible to heat discoloration.

Further, each of the fluorinated elastomer compositions in Examples 1 to 3 was excellent in processability with MFR being within from 10 to 20 g/10 min. Whereas, the fluorinated elastomer composition in Comparative Example 1 containing no component (b) was inadequate in processability with MFR being less than 4.

The fluorinated elastomer compositions in Comparative Example 3 containing the component (c) excessively although containing the component (b) and Comparative Example 6 using the component (d) instead of the component (c), were materials inferior in heat ageing resistance with the retention of strength for heat ageing resistance was at most 90%.

Further, from the comparison of Example 1 and Comparative Example 4 wherein the mass ratio of the component (a) to the component (b) is 50:50, the maximum withdrawing speed was larger in Example 1 than in Comparative Example 4, and thus it is evident that the processing efficiency is improved by incorporation of the component (c).

Further, each of the cross-linked samples in Examples 1 to 3 showed good results in all items of normal state physical properties (initial tensile strength and tensile elongation) and heat ageing resistance (retention of strength, and retention of elongation). Whereas, each of the cross-linked samples in Comparative Examples 1 to 7 had a problem in at least one of items of normal state physical properties (initial tensile strength and tensile elongation) and heat ageing resistance (retention of strength, and retention of elongation).

Further, each of the cross-linked samples in Examples 1 to 3 was excellent in ATF resistance with the volume change being small. On the other hand, the cross-linked product in Comparative Example 1 containing no component (b) was inferior in ATF resistance with the volume change being large. Further, also the cross-linked samples in Comparative Examples 3 and 5 containing the component (c) excessively although containing the component (b) and Comparative Example 6 using the component (d) instead of the component (c), were inferior in ATF resistance with the volume change being large.

Further, each of the cross-linked samples in Examples 1 to 3 had flexibility with the flexural modulus being sufficiently low.

Example 4

The components (a), (b) and (c) in Table 3 were put all at once into a 15 mm twin screw extruder (L/D=45) and kneaded for 2 minutes. The temperature was from 250 to 300° C., and the screw rotational speed was from 300 to 400 rpm. The kneaded product was pelletized to obtain a fluorinated elastomer composition having the same composition as in Example 1 in Table 1.

The obtained fluorinated elastomer composition was applied by extrusion in a thickness of 0.5 mm on a conductor (tin-plated copper core stranded wire) having an outer diameter of 1.8 mm to obtain a non-crosslinked covered electric wire. Then, a part of the non-crosslinked covered electric wire was irradiated with electron beams at 120 kGy to obtain a cross-linked covered electric wire.

Comparative Example 8

The components (a) and (b) in Table 3 were put all at once into a 15 mm twin screw extruder (L/D=45) and kneaded for 2 minutes. The temperature was from 250 to 300° C., and the screw rotational speed was from 300 to 400 rpm. The kneaded product was pelletized to obtain a fluorinated elastomer composition having the same composition as in Comparative Example 4 in Table 1.

A non-crosslinked covered electric wire and a cross-linked covered electric wire were obtained in the same manner as in Example 4 except that the obtained fluorinated elastomer composition was used.

Comparative Example 9

The components (a) and (b) in Table 3 were put all at once into a 15 mm twin screw extruder (L/D=45) and kneaded for 2 minutes. The temperature was from 250 to 300° C., and the screw rotational speed was from 300 to 400 rpm. The kneaded product was pelletized to obtain a fluorinated elastomer composition having the same composition as in Comparative Example 7 in Table 1.

A non-crosslinked covered electric wire and a cross-linked covered electric wire were obtained in the same manner as in Example 4 except that the obtained fluorinated elastomer composition was used.

Evaluation of Covered Electric Wire

With respect to six types of covered electric wire obtained in each Example, in order to confirm the peeling phenomenon of the covering material starting from the weld line, a high temperature self-wrapping test was carried out. Further, in order to confirm the heat resistance of the covered electric wire as a molded product, a high temperature cracking temperature test was carried out.

High Temperature Self-Wrapping Test

The prepared each covered electric wire was cut in every 1 m length to obtain electric wire samples. Five electric wire samples were prepared for each of the six types of covered electric wire obtained in each Example, and they were heated for 96 hours in a constant temperature vessel at 190° C. and then cooled to room temperature. Then, with respect to each electric wire sample, around one end side of the electric wire sample itself, the rest portion thereof was densely wound at least 10 times so that the adjacent wound portions were in contact with one another, and the sample thus self-wrapped was again heated for one hour in a constant temperature vessel at 200° C. and cooled to room temperature. After the cooling, whether or not peeling or cracking of the insulation covering material is observed, was visually confirmed. A case where no peeling or cracking was observed with respect to all of the five samples, was evaluated to be ○ (good), and a case where peeling or cracking was observed on at least one of the samples, was evaluated to be X (no good).

(High Temperature Cracking Temperature Test)

The prepared each covered electric wire was cut in every 1 m length to obtain electric wire samples. Five electric wire samples for every predetermined temperature were prepared for each of the six types of covered electric wire obtained in each Example, and they were heated for 96 hours in a constant temperature vessel maintained at a predetermined heating temperature (T) and then cooled to room temperature. The heating temperature was within a range of from 180 to 200° C. and was set at intervals of 5° C. (ΔT=20° C.).

Then, with respect to each electric wire sample, around one end side of the electric wire sample itself, the rest portion thereof was densely wound at least 10 times so that the adjacent wound portions were in contact with one another, and the sample thus self-wrapped was again heated for one hour in a constant temperature vessel at 200° C. and cooled to room temperature. After the cooling, whether or not peeling or cracking of the insulation covering material is observed, was visually confirmed.

From the results, the maximum temperature (Th) where all underwent cracking, and the sum (S) of cracking percentages were obtained, and the high temperature cracking temperature (Tc) was calculated by the following formula. The results are shown in Table 3.

High temperature cracking temperature $(Tc)=Th+\Delta T$
$(S/100-\frac{1}{2})$

Cracking percentage: The number of samples where peeling or cracking was observed at each heating temperature (T)/5×100

Sum (S) of cracking percentages: Total of cracking percentages at the respective heating temperatures (T)

Maximum temperature (Th) where all samples underwent cracking: The heating temperature at which all of the 5 samples underwent peeling or cracking.

TABLE 3

| | Example 4 | Comparative Example 8 | Comparative Example 9 |
|---|---|---|---|
| Component (a) | 50 | 50 | 40 |
| Component (b) | 50 | 50 | 60 |
| Component (c) | 1 | — | — |
| Filler | 20 | 20 | 20 |
| Cross-linking aid | 5 | 5 | 5 |
| No electron beam cross-linking treatment | | | |
| High temperature self-wrapping test | ○ | X | X |
| High temperature cracking temperature (° C.) | 196.5 | 175 | 173 |
| Electron beam cross-linking treatment conducted | | | |
| High temperature self-wrapping test | ○ | ○ | ○ |
| High temperature cracking temperature (° C.) | >200 | >200 | >200 |

As a result of the high temperature self-wrapping test, as shown in Table 3, the covered electric wire in Example 4 did not undergo peeling or cracking of the covering material starting from the weld line, irrespective of whether the electron beam cross-linking was conducted or not. On the other hand, the covered electric wires in Comparative Examples 8 and 9 underwent peeling or cracking of the covering material starting from the site of the weld line, in the case where no electron beam cross-linking was conducted.

Further, as a result of the high temperature cracking temperature test, the covered electric wire in Example 4 showed the maximum temperature where all samples underwent cracking, in the vicinity of 200° C., even in the case where no electron beam cross-linking was conducted. On the other hand, the covered electric wires in Comparative Examples 8 and 9 were inferior in heat resistance with the maximum temperature where all samples underwent cracking, being low in the case where no electron beam cross-linking was conducted.

INDUSTRIAL APPLICABILITY

The fluorinated elastomer composition of the present invention is excellent in flexibility and oil resistance against lubricant oil such as automatic transmission oil, is less susceptible to heat discoloration and is excellent also in moldability.

Further, the molded product, cross-linked product or covered electric wire of the present invention is excellent in flexibility and oil resistance against lubricant oil such as automatic transmission oil, is less susceptible to heat discoloration and has little defects such as weld-lines due to molding failure.

Accordingly, it is suitable for use as an insulation covering material or sheath material for electric wires or cables to be used in various fields including automobiles, industrial robots, heating instruments, etc. Further, by utilizing its excellent characteristics, it is useful also for hoses, gaskets, packing, diaphragms, etc., in the fields of automobile components, industrial robots, industrial products, etc.

This application is a continuation of PCT Application No. PCT/JP2013/058633, filed on Mar. 25, 2013, which is based upon and claims the benefit of priority from Japanese Patent Application No. 2012-069078 filed on Mar. 26, 2012. The contents of those applications are incorporated herein by reference in their entireties.

What is claimed is:

1. A fluorinated elastomer composition comprising the following tetrafluoroethylene/propylene copolymer (a), the following ethylene/tetrafluoroethylene copolymer (b) and an ethylene copolymer (c) containing epoxy groups, wherein the mass ratio [(a)/(b)] of the tetrafluoroethylene/propylene copolymer (a) to the ethylene/tetrafluoroethylene copolymer (b) is from 70/30 to 40/60, and the mass ratio [(b)/(c)] of the ethylene/tetrafluoroethylene copolymer (b) to the ethylene copolymer (c) containing epoxy groups is from 100/0.1 to 100/10, tetrafluoroethylene/propylene copolymer (a): a copolymer comprising from 45 to 70 mol % of units derived from tetrafluoroethylene, from 30 to 55 mol % of units derived from propylene, and from 0 to 20 mol % of units derived from other monomer, and ethylene/tetrafluoroethylene copolymer (b): a copolymer comprising from 45 to 70 mol % of units derived from tetrafluoroethylene, from 30 to 55 mol % of units derived from ethylene, and from 0 to 20 mol % of units derived from other monomer.

2. The fluorinated elastomer composition according to claim 1, which has a melt flow rate of from 4 to 50 g/10 min. as measured at a temperature of 297° C.

3. The fluorinated elastomer composition according to claim 1, wherein the ethylene/tetrafluoroethylene copolymer (b) is a copolymer comprising units derived from tetrafluoroethylene, units derived from ethylene, and units derived from $CF_3CF_2CF_2CF_2CF=CH_2$ or $CF_3CF_2CF_2CF_2CF_2CF_2CH=CH_2$.

4. The fluorinated elastomer composition according to claim 1, wherein the ethylene copolymer (c) containing epoxy groups is a copolymer comprising units derived from ethylene, units derived from glycidyl methacrylate and units derived from an ethylene unsaturated ester.

5. A method for producing a fluorinated elastomer composition as defined in claim 1, which comprises a step of kneading the tetrafluoroethylene/propylene copolymer (a), the ethylene/tetrafluoroethylene copolymer (b) and the ethylene copolymer (c) containing epoxy groups under a heating condition of from 250 to 320° C.

6. The method for producing a fluorinated elastomer composition according to claim 5, wherein the step of kneading is a step of kneading for from 1 to 30 minutes by means of an extruder.

7. A molded product obtained by molding the fluorinated elastomer composition as defined in claim 1.

8. A cross-linked product obtained by cross-linking the fluorinated elastomer composition as defined in claim 1.

9. A covered electric wire comprising a conductor and a covering material for covering the conductor, wherein the covering material is the fluorinated elastomer composition as defined in claim 1.

10. A covered electric wire comprising a conductor and a covering material for covering the conductor, wherein the covering material is the cross-linked product as defined in claim 8.

* * * * *